(12) United States Patent
Leymann et al.

(10) Patent No.: US 7,174,338 B2
(45) Date of Patent: Feb. 6, 2007

(54) SIGNALING EVENTS IN WORKFLOW MANAGEMENT SYSTEMS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 10/477,000

(22) PCT Filed: Apr. 17, 2002

(86) PCT No.: PCT/EP02/04252

§ 371 (c)(1),
(2), (4) Date: Nov. 6, 2003

(87) PCT Pub. No.: WO02/093437

PCT Pub. Date: Nov. 21, 2002

(65) Prior Publication Data

US 2004/0177074 A1 Sep. 9, 2004

(30) Foreign Application Priority Data

May 12, 2001 (EP) ................................... 01111629

(51) Int. Cl.
*G06F 17/00* (2006.01)
(52) U.S. Cl. ..................... 707/101; 707/102
(58) Field of Classification Search ............... 707/100, 707/101, 102; 718/103
See application file for complete search history.

(56) References Cited

U.S. PATENT DOCUMENTS 6,115,646 A 9/2000 Fiszman et al. ............ 700/181
6,122,633 A 9/2000 Leymann et al. ............. 707/10
6,976,257 B2 * 12/2005 Leymann et al. ........... 718/103

FOREIGN PATENT DOCUMENTS

| EP | 0854431 | 7/1998 |
|----|---------|--------|
| WO | 9963463 | 12/1999 |
| WO | 0111509 | 2/2001 |

OTHER PUBLICATIONS

G. Cugola, et al, The JEDI event-based infrastructure and its application to the development of the OPSS WFMS and Exploiting an event-based infrastructure to develop complex distributed systems, 1998,IEEE, pp. 1-10 and pp. 1-54.*
Cugola, G. et al. "Exploiting an Event-Based Infrastructure to Develop Complex Distributed Systems", Software Engineering, 1998. IEEE Comput. Soc, US. XP010276009, pp. 261-270.

* cited by examiner

*Primary Examiner*—Apu M. Mofiz
(74) *Attorney, Agent, or Firm*—David R. Irvin

(57) ABSTRACT

The present invention provides a computerized method for determining an addressee of a signaling request within a Workflow Management System or a computer system with comparable functionality (WFMS). Upon receiving a signaling request, which is providing a set of signal data elements, the current invention avoids the requirement that the signal data elements comprise any explicit specification of an addressee of said signaling request. To determine whether an event-activity of a process-instance being the instance of a process-model of a business-process is the potential addressee of the signaling request it is suggested to determine, whether the process-model comprises an event-identification-specification. This event-identification-specification according to the current invention is involving a subset of the signal data elements. Evaluating the event-identification-specification allows to indirectly decide if the event-activity is the addressee of the signaling request.

7 Claims, 5 Drawing Sheets

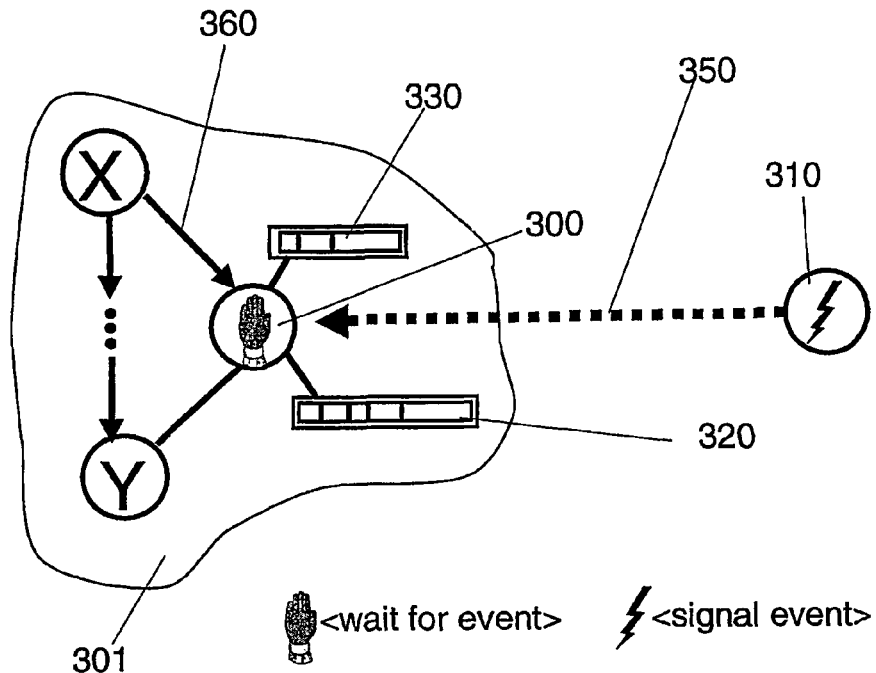

FIG. 3

```
         400                    410
        /                      /                440
                                               /
<complexType name="SignalMessage">
    <sequence>          420      430
        <element name="messageId" type="string"/>
        <element name="contractId" type="string"/>
        <element name="actionId" type="string"/>
        <element name="eventId" type="string"/>
        <element name="amountOffered" type="Integer"/>
        <element name="businessProcessID" type="Integer"/>
    </sequence>
</complexType>
```

FIG. 4

```
DATASTRUCTURE SignalMessage XML SignalMessage
END SignalMessage

DATASTRUCTURE EventOutput
      AmountOffered INTEGER
END EventOutput

EVENT_ACTIVITY ReceiveOffer                        610
      OUTPUT EventOutput
      SIGNAL SignalMessage
            MESSAGE_IDENTIFICATION (messageId = "512")
            PEOCESS_MODEL businessProcessID
            PROCESS_INSTANCE ContractId
            TARGET_IDENTIFICATION (ActionId = "ReceiveOffer")
            MAP SignalMessage.AmountOffered TO
                  EventOutput.AmountOffered
END ReceiveOffer
```

FIG. 6

```
DATASTRUCTURE SignalMessage XML SignalMessage
END SignalMessage

DATASTRUCTURE EventOutput
      AmountOffered INTEGER
END EventOutput

EVENT_ACTIVITY ReceiveOffer                        710
      OUTPUT EventOutput
      SIGNAL SignalMessage
            MESSAGE_IDENTIFICATION XML_SCHEMA      720
            ACTIVITY_IDENTIFICATION EventId
            MAP SignalMessage.AmountOffered TO
                  EventOutput.AmountOffered
END ReceiveOffer
```

FIG. 7

SIGNALING EVENTS IN WORKFLOW MANAGEMENT SYSTEMS

1. BACKGROUND OF THE INVENTION 1.1 Field of the Invention

The present invention relates to means and a method for improving the robustness and ease-of-use of Workflow-Management-Systems or a computer system with comparable functionality (WEMS) related to the signaling of events.

1.2 Description and Disadvantages of Prior Art

A new area of technology with increasing importance is the domain of Workflow-Management-Systems (WFMS). WFMS support the modeling and execution of business processes. Business processes executed within a WEMS environment control who will perform which piece of work of a network of pieces of work and which resources are exploited for this work. The individual pieces of work might be distributed across a multitude of different computer systems connected by some type of network.

The product "IBM MQSeries Workflow" (previously called IBM FlowMark) represents such a typical modern, sophisticated, and powerful workflow management system. It supports the modeling of business processes as a network of activities. This network of activities, the process model, is constructed as a directed, acyclic, weighted, colored graph. The nodes of the graph represent the activities, which are performed. The edges of the graph, the control connectors, describe the potential sequence of execution of the activities. Definition of the process graph is via IBM MQSeries Workflow's Flow Definition Language (FDL) or via the built-in graphical editor.

The runtime component of the Workflow-Management-System uses said process model as a template to create process instances. Each process instance is associated with a set of values, typically called the context. Said values are either supplied by the requestor of the process instance via the appropriate request or retrieved by programs that implement the various activities or are the result of the execution history of a certain process instance. The context is unique to a certain process instance. A particular important piece of information within said context is the process instance identifier that uniquely identifies a process instance. It should be noted that typically process instance identifiers are only unique within the set of process instances that are derived from a particular process model.

Particular important types of activities are event activities. An event activity provides the capability to have a process instance waiting until signaled. The signal, or in other words the event, may be created within the WFMS but typically will have its source in the outside of the workflow management system. Upon receiving said signal, the workflow management system stores the supplied information as context information (in this case into the output container of the event activity) and continues navigation.

Signaling the event is done via an appropriate signal request to the workflow management system. Said signal request may be created by a program exploiting the application-programming interface offered by the workflow management system or by sending an appropriate workflow management system defined message to the workflow management system that can typically carry such a signal request. Independently of how signaling is done, the signaling request must contain the appropriate process instance identifier of the process instance in which the event is waiting as well as the identification of the event. This information is necessary so that the workflow management system can locate the correct process instance and the correct event within the process model. If the issuer of the signaling request does not know the event identification or even does not know the process instance identifier, the issuer must obtain this information. To facilitate this the workflow management provides query capabilities that allow the issuer to query the input container of the-event activity. It is the responsibility of the process modeler to make sure that the input container of the event activity contains the appropriate values from which the process instance identification can be derived.

This state-of-the-art approach has several deficiencies, in particular when an event is signaled by sending a message to the workflow management system:

The signaler of the event must indicate to the workflow management system that the request is for signaling an event; that means the requester must follow the message structure defined by the workflow management system. This structure typically mandates to have certain indicators, such as the command that the message represents, in certain places of the message; for example the text string signal as the first field of the message. This mandates that an existing message-oriented signaler program must be adapted when the signal should now be processed by a workflow management system; an approach that is not always possible to implement. Another approach to overcome this situation is the usage of a translation program that translates the signaler's original message into the workflow management specific message; an approach that increases not only the complexity of the overall system (making maintenance and system management much more complicated) but also decreases performance for generating a signal.

The signaler must maintain the process instance identifier of the target process instance. If this is not possible, the signaler must obtain appropriate information (data in the input container of the event) from the workflow management system. This requires that the signaler already knows the name of the event so that it can set up the appropriate query to the workflow management system. This has the disadvantage that every change made to the process model such as changing the name of the event requires re-programming on the signaler's part (such as adapting the new name of the event).

The signaler must know the name (according to the nomenclature of the WEMS) of the event even if it knows the process instance identifier. Knowing the name includes knowing to some extent the structure of the process model; for example the process model could use the same name multiple times within the same process model, a situation that can easily arise when one synthesizes more, complex process models from simpler process models.

The above listed deficiencies make it obvious that the current state of the art enforces a tight coupling between the signaler of an event and the workflow management system manifested by the information that the signaler must maintain about information that the workflow management system maintains. This situation is quite undesirable for the reasons outlined above. It should be possible to specify in the workflow management system all information necessary to process an almost arbitrary message for signaling an event. Further it should be possible for an arbitrary signaling of events to send signaling events to a WFMS without said signal being adapted to WEMS requirements. The arbitrary signaler should allowed to be unaware of the concrete nature of the consumer (that is the addressee) of the signaling requests. Then it is possible that the signaler can be developed independently from the consumer of the signaling request.

The weakness of the state-of-the-art approaches with respect to this problem area becomes even more distinct if one thinks of typical Internet scenarios commonly summarized by terms like C2B (Consumer-to-Business) or B2B (Business-to-Consumer) business processes. In these scenarios, it is obvious that the tight coupling of signaler to the workflow management system is not desirable at all.

1.2 Objective of the Invention

The invention is based on the objective to eliminate the need for event signalers to maintain information that is needed to locate the appropriate event in the appropriate process instance waiting for notification of said event.

2. SUMMARY AND ADVANTAGES OF THE INVENTION

The objectives of the invention are solved by the independent claims. Further advantageous arrangements and embodiments of the invention are set forth in the respective subclaims.

The present invention provides a computerized method for determining an addressee of a signaling request within a Workflow Management System or a computer system with comparable functionality (WFMS).

Upon receiving a signaling request, which is providing a set of signal data elements, the current invention avoids the requirement that the signal data elements comprise any explicit specification of an addressee of said signaling request.

To determine whether a particular event-activity of a process-instance being the instance of a process-model of a business-process is the potential addressee of the signaling request it is suggested to determine, whether the process-model comprises an event-identification-specification. This event-identification-specification according to the current invention involves a subset of the signal data elements. Evaluating the event-identification-specification allows to indirectly decide if the event-activity is the addressee of the signaling request.

The suggested teaching avoids all of above-mentioned deficiencies. Relieving the signaler of a signaling request from specifying a certain addressee based on the suggested approach offers the further advantage that multiple addressees might exist for a single signaling messaging.

3. BRIEF DESCRIPTION OF THE DRAWINGS

FIG. 3 illustrates the structure of an event activity that when activated waits for a message to be processed.

FIG. 4 illustrates the definition of a message signaling an event using an XML schema definition for describing the contents of the message.

Figure 5:
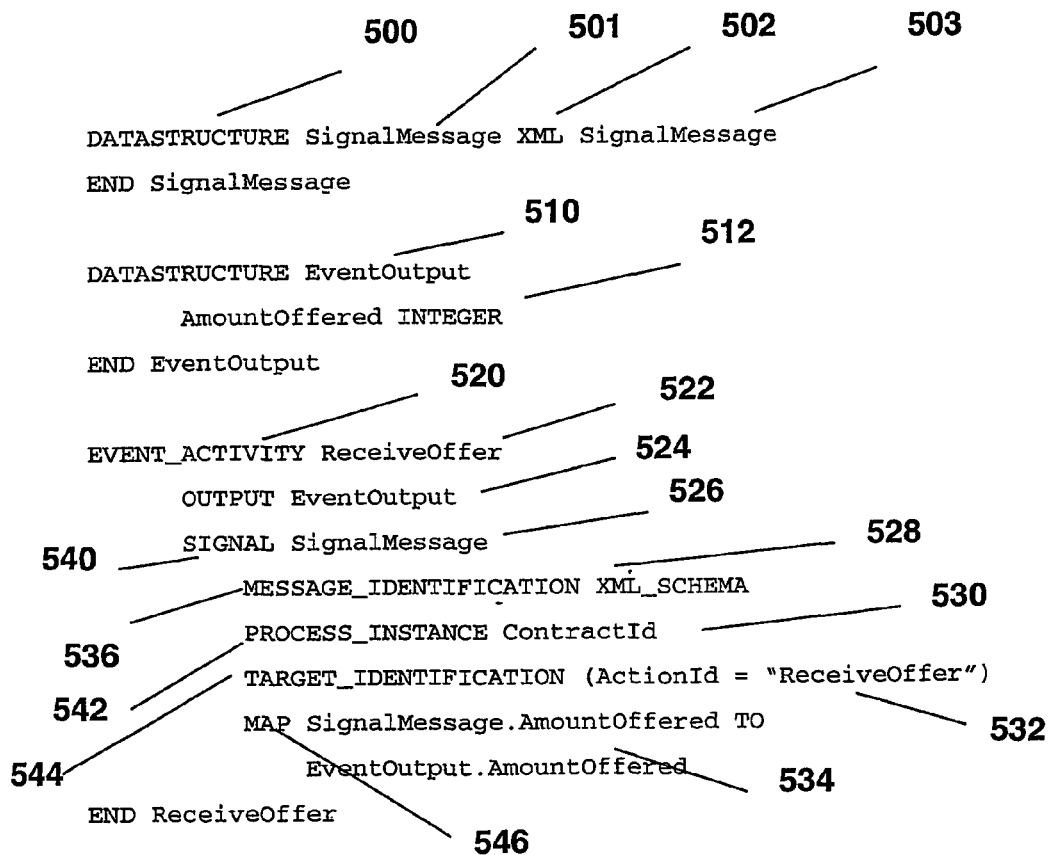

FIG. 5 visualizes the details of the necessary specifications using the Flow Definition Language of MQSeries Workflow.

FIG. 6 illustrates an alternate method of determining the structure of a message that signals an event.

FIG. 7 illustrates an alternate method of identifying the event that is the target of a signaling message.

4. DESCRIPTION OF THE PREFERRED EMBODIMENT

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on IBM's "MQSeries Workflow" workflow management system. Of course any other WFMS could be used instead. Furthermore the current teaching applies also to any other type of system, which offers WFMS functionalities not as a separate WFMS but within some other type of system.

According to the current teaching it is advantageous if the WFMS engine is the processing entity to determine the addressee(s) of any signaling request based on the data elements provided by the signaler. But of course, the current invention can be applied in other scenarios wherein the processing entity of the request for signaling an event is not the WFMS engine itself some other entity.

4.1 Introduction

The following is a short outline on the basic concepts of a workflow management system based on IBM's "MQSeries Workflow" WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMS facilitates the management of business processes. It provides a means to describe models of business processes (buildtime) and it drives business processes based on an associated model (runtime). The meta model of IBM's WFMS MQSeries Workflow, i.e. the syntactical elements provided for describing business process models, and the meaning and interpretation of these syntactical elements, is described next.

A process model is a complete representation of a process, comprising a process diagram and the settings that define the logic behind the components of the diagram. Important components of an MQSeries Workflow process model are:

Processes
Activities
Blocks
Control Flows
Connectors
Data Containers
Data Structures
Conditions
Programs
Staff Not all of these elements will be described below.

Activities are the fundamental elements of the meta model. An activity represents a business action that is from a certain perspective a semantic entity of its own.

An MQSeries Workflow process model consists of the following types of activities:

Program activity: Has a program assigned to perform the activity. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform the activity. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The MQSeries Workflow workflow manager navigates a path through the process that is determined by the evaluation to TRUE of start conditions, exit conditions, and transition conditions.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Process definition includes modeling of activities, control connectors between the activities, input/output container, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the DataStructureDefinition facility. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up).

All programs, which implement program activities, are defined via the Program Registration Facility. Registered for each program is the name of the program, its location, and the invocation string. The invocation string consists of the program name and the command string passed to the program.

Figure 1:
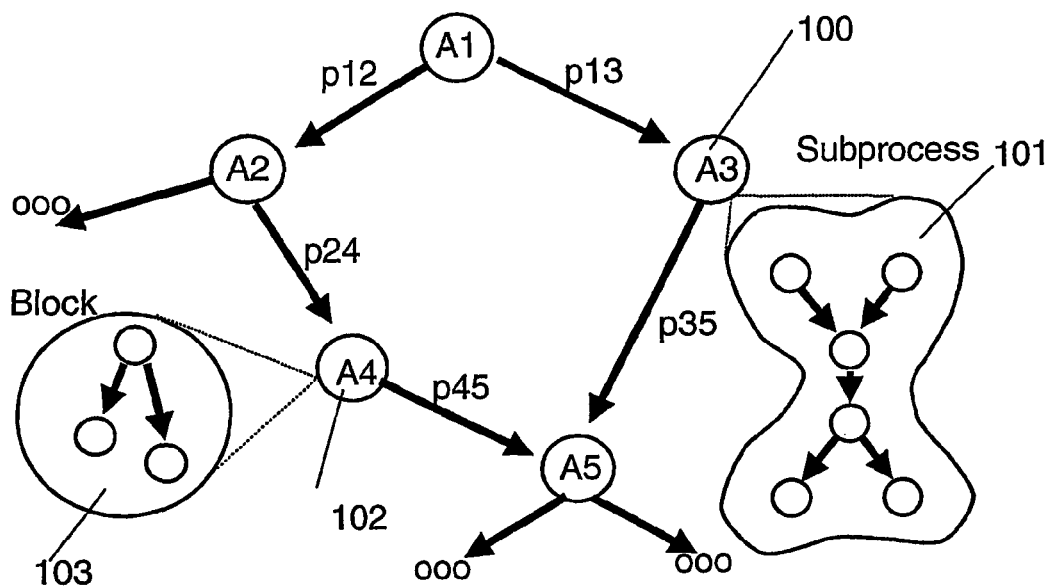
FIG. 1 shows an example of a process model represented by a process graph.

As an example of such a process model FIG. 1 shows schematically the structure of such a process graph. Activities (A1 up to A5) are represented as named circles; the name typically describes the purpose of the activity. Activities come in various flavors to address the different tasks that may need to be performed. They may have different activity implementations to meet these diverse needs. Program activities are performed by an assigned program, process activities like for instance 100 are performed by another process 101, and blocks like for instance 102 implement a macro 103 with a built-in do-until loop. Control connectors p12, p13, p24, p35, p45 are represented as arrows; the head of the arrow describes the direction in which the flow of control is moving through the process. The activity where the control connector starts is called the source activity; where it ends is called the target activity. When more than one control connector leaves an activity, this indicates potentially parallel work.

4.2 Containers and Data Connectors

Figure 2:
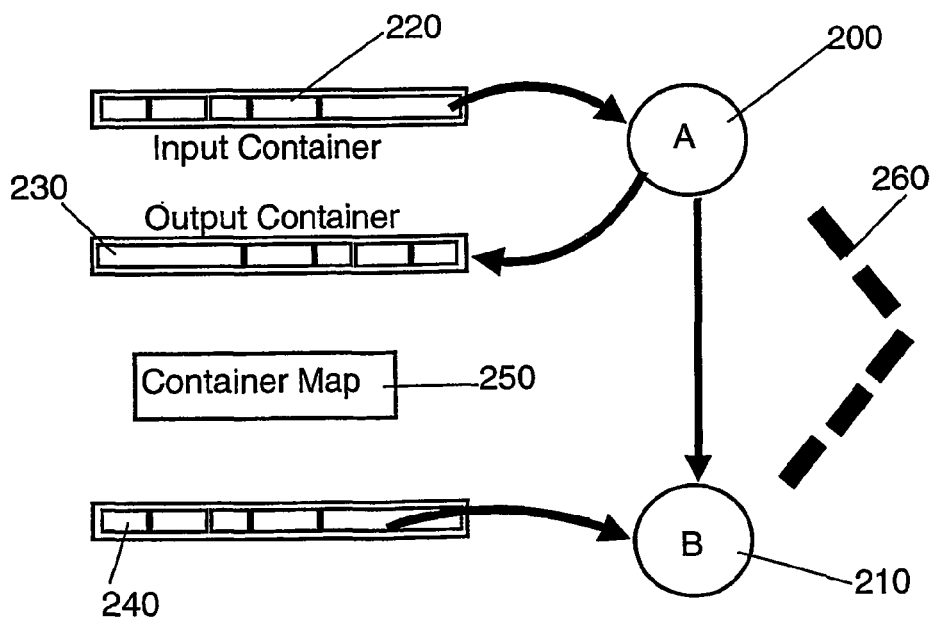
FIG. 2 illustrates the implementation of signatures of activities as input and out containers and the movement of data from one activity to another activity via data connectors

FIG. 2 shows the two activities A 200 and B 210, Which may be part of a more complex process model. Both activities A 200 and B 210 have an input container 220, 240 associated with them; activity A 200 has also an output container 230 associated with. In a fundamental alteration according to the current invention the input and output container of an activity can be viewed conceptually as the signature of the activity. The activity obtains data necessary for its execution from the input container and writes data that it produces and that is needed for other activities into the output container. As with signatures, the containers of an activity are only available to the activity; that means they are only available locally. For example, the input container 220 and the output container 230 are only available to the associated activity A 200. Thus, if activity B 210 needs data, for example, from the output container 230 of the activity A 200, this data must be copied from the output container 230 of the activity A 200 to the input container 240 of the activity B 210.

For the purpose of copying data from one of the activities to another activity, a data connector 260 is provided which is depicted in FIG. 2 as a dashed arrow. The data connector 260 of FIG. 2 indicates that all or parts of the output container 230 of the activity A 200 has to be copied to the input container 240 of the activity B 210.

The output container of one activity and the input container of another activity, however, generally have different data structures, for example containing different data fields. Therefore, a container map 250 is provided in FIG. 2 which defines which data fields of the output container 230 of the activity A 200 are copied into which data fields of the input container 240 of the activity B 210. The container map 250 also specifies if a transformation of the data has to be performed by the workflow management system before the data is copied e.g. into the input container 240 of the activity B 210.

4.3 Event Activities

Event activities are another type of activities that workflow management systems support. They provide the capability to have a process instance wait until the event is signaled for instance from outside the workflow management system upon. Upon receiving the signal, the workflow management system processes the request and continues navigation. An event activity has most of the properties program and process activities. Is associated with an input and an output container. It can be source and the target of control connectors as well as the source and target of data connectors. It has a start condition, and a deadline can be specified for it.

FIG. 3 illustrates this schematically showing portion 301 of some more complex process model. An event activity 300 goes into the waiting state as soon the control connector 360 enters the event activity. If in realization of a process model the event activity has no incoming control connector, the event activity goes into the waiting state as soon as the process instance is created. The event activity remains in this state until the event is signaled. Some client 310 is issuing an appropriate request 350 to the workflow management system signaling the event the event activity 300 is waiting for. This request must (1) identify the appropriate event (2) in the appropriate process instance as addressee. Additionally the event signal may supply data that is stored in the output container 320, so that information provided by the event signaler can be made available to the process instance. When the event is signaled correctly, navigation continues. Further details on event activities can be found in Leymann/ Roller, Production Workflow: Concepts and Techniques, Prentice Hall, N.J. ISBN and in U.S. Pat. No. 6,065,009 Events as Activities in Process Models of Workflow Management Systems.

4.4 Defining Messages via XML

FIG. 4 shows the definition of a message via XML Schema Definition (see http://www.w3.org for details about XML and XML schema). The purpose of the message is to signal an event to the event activity defined in FIG. 5. The keyword complexType 400 starts the definition of a user-defined XML structure. The name of the structure is SignalMessage 410. The structure consists of a set of elements 420, with an element name 430 and a data type 440 of said element.

4.5 Processing the Signaling of an Event

FIG. 5 illustrates how the present invention can be implemented/specified using the Flow Definition Language (FDL) of MQSeries Workflow, a state-of-the-art Workflow-Management-System sold by the applicant. FDL is used as an example only; any other way of specifying the signaling of events can be used. The underlying meta model is also for illustration only; other meta models can be used instead.

The important teaching of the current invention is to provide a technology allowing an arbitrary signaler of an event to be completely unaware of the addressee of a signaling request; that means the concrete process instance waiting for said event. This releases the signaler from maintaining the process instance identifier of the awaiting concrete process instance and from maintaining the identifier of event activity within the corresponding process model.

Is a fundamental observation of the current invention that the data elements or a subset of the data elements provided by the signaler within the signaling request can be exploited by the WFMS itself to uniquely identify the concrete process instance (or process instances) and/or the concrete event activity (or event activities) being the addressee(s) of the event.

To enable the WFMS to perform this identification task it is suggested to enhance the process model comprising an event activity with specifications defining that set of (one or multiple) data elements provided by the signaling request to be used to identify a certain process instance of said process model and said event activity as addressee. Once the signaling request is received by the WFMS, the WFMS knowing the process model would exploit these predefined event identification specifications and the concrete data elements provided with the signaling request to determine the concrete addressee of the event.

The example illustrates the definition of an event activity that exploits the present invention.

The DATASTRUCTURE definition 500 identifies a data structure with the name SignalMessage 501. The data structure references (via the XML keyword) 502 an XML schema SignalMessage 503 (this is the XML schema defined in FIG. 4). This data structure defines the structure of the message that is accepted a signal that posts the event activity 520.

The DATASTRUCTURE definition 510 identifies a data structure with the name EventOutput. The data structure contains a field AmountOffered of type INTEGER 512. This data structure is used for the output container of the event activity 520; the field AmountOffered is intended as the target for the appropriate field supplied in the signaling message.

The event activity is defined via the EVENT_ACTIVITY keyword 520; the name of the event activity is ReceiveOffer 522. The output container of the event activity is defined via the OUTPUT keyword, which identifies the data structure EventOutput 524 as the structure for the output container.

The keyword SIGNAL 540 identifies all properties associated with signaling the event; in specific the event identification specifications proposed by the current invention are comprised within this section. Within the current example it identifies that the data structure SignalMessage 526 represents the structure of the message signaling the event.

The keyword MESSAGE_IDENTIFICATION 536 is used to indicate to the workflow management system how the structure of the message should be determined; that is defining the layout of the message. The parameter XML_SCHEMA 528 indicates that the message provided XML schema name should be used (this is typical for XML messages as it is desireable to be able to use an XML parser for parsing the message). Other possible parameter values of the MESSAGE_IDENTIFICATION parameter will be discussed below. If the signaling message is of the specified XML schema, the workflow management system takes this message as a potential signaling message for this ReceiveOffer activity. That means, if the signaling message is of XML schema SignalMessage, the signaling message is a candidate for a signaling message for the event activity ReceiveOffer 522.

The keyword PROCESS_INSTANCE 542 identifies the field(s) in the signaling message that should be used to identify the process instance. In the example, the field ContractId 530 from the XML message is used. In general the process instance can be identified by any arbitrary complex Boolean expression involving values of data elements within the signaling message and data elements from the process instance's context.

The keyword TARGET_IDENTIFICATION 544 is used to define an expression 532 that when it evaluates to true, the signaling message is targeted towards the event activity. Thus this keyword allows identifying the concrete activity within the process model the event is to be signaled to by the WFMS. The expression is constructed by using one or more fields in the signaling message. In the example, the signaling message is targeted for this activity, if the field ActionId in the signaling message contains the text string ReceiveOffer.

The MAP keyword 546 provides for the capability of mapping fields from the signaling message to the activity output container. In the example, it copies the field AmountOffered from the signaling message to the output container. Other possibilities are the copying of fields of the signaling message to a global/key container (see Leymann/Roller: Production Workflow: Concepts and Techniques, Prentice Hall, 2000 for details).

Another possibility to identify the structure of a signaling message is illustrated in FIG. 6. It defines an expression, that when it evaluates to true, the signaling message has the structure specified as the signaling message structure. That means when the field messageId 610 contains the value 512, the signaling message has the structure defined for the signaling message and therefore is a candidate for a signaling message for the event activity ReceiveOffer.

FIG. 6 proposes a solution to a further problem. In certain environments potential addressees are unique only within said certain domains. Examples for such a situation are process instance identifiers, which are unique only within that set of process instances, which are derived from a common process model.

To cope with such situations it is suggested that the event identification specification comprises specifications, which, when evaluated, allow to limit the scope of potential addressees to process instances of a common process model. The specific embodiment 620 in FIG. 6 allows to construe from one or more data elements of the signaling message (in this example the parameter businessProcessID—refer to FIG. 4) an identifier of a process model. As a consequence only process instances which are instantiated from process models with this construed identifier are viewed as potential addressees; of course the other specifications within event identification specifications will further narrow and identify the concrete addressee(s).

An event within a process instance is uniquely identified via an activity instance identifier. Thus an alternate approach exists for the specification of the target of a signaling message. Said specification is an alternate specification for the combination of PROCESS_INSTANCE and TARGET_IDENTIFICATION specification. FIG. 7 illustrates how such a specification could look like. The keyword ACTIVITY_IDENTIFICATION 710 identifies one or more fields within the signaling message to construe (even by a more complex expression) the identifier of an event activity being the addressee of the signaled event. In the current example, the field EventId 720, which is part of the signaling message, is used directly to construe the event activity identifier representing said addressee.

At runtime the above specifications are used by the WEMS in the following manner:

First the WFMS determines the structure of the signaling message. This requires inspecting all MESSAGE_DEFINITIONs for all event activities in all process models. If the structure of the signaling message cannot be determined, the WEMS assumes that the message is not an event-signaling message and takes other necessary actions.

Second, the WFMS determines the process instance that is the target of the signaling message.

Third, the WFMS determines the activity instance within said process instance that is the target of the signaling message.

Fourth, the WFMS copies fields from the signaling message to the context of the process instance.

The invention claimed is:

1. A computerized method for determining an addressee of a signaling request within a Workflow Management System or a computer system with comparable functionality (WFMS), said WFSM administrating a process-instance being the instance of a process-model of a business-process: and said method being further characterized by said process-model comprising at least one event-activity, and in a first-step said WFMS receiving a signaling request, said signaling request providing a set of signal data elements; and said signal data elements not comprising any explicit specification identifying said process-instance or said event-activity as addressee of said signaling request; and in a second-step said WFMS determining whether said process-model comprises an event-identification-specification involving a subset of said signal data elements: and, in the affirmative case, evaluating said event-identification-specification to indirectly decide if said event-activity is an addressee of said signaling request; and, in a third-step said WFMS providing said signaling request to said event-activity as addressee.

2. A computerized method for determining an addressee of a signaling request according to claim 1, wherein said event-identification-specification comprises a first-specification, which by evaluating is deciding if said process-instance is said addressee of said signaling request.

3. A computerized method for determining an addressee of a signaling request according to claim 2, wherein said event-identification-specification comprises a second-specification, which by evaluating is deciding if said event-activity of said process-instance is said addressee of said signaling request.

4. A computerized method for determining an addressee of a signaling request according to claim 3, wherein at least one of the first and second specifications comprises a Boolean-predicate further involving data elements of a context of said process-instance.

5. A computerized method for determining an addressee of a signaling request according to claim 3, wherein said second-specification is construing from said subset of said signal data elements a first identifier to be compared to a second identifier identifying said event-activity for deciding if said event-activity of said process-instance is said addressee of said signaling request.

6. A computerized method for determining an addressee of a signaling request according to claim 2, wherein said event-identification-specification comprises a fourth-specification, which by evaluating is limiting the scope of potential addressees to process instances of said process model.

7. A computerized method for determining an addressee of a signaling request according to claim 1, wherein said event-identification-specification comprises a third-specification to decide based on the type of said signaling request if said process-instance is said addressee of said signaling request.

* * * * *